(12) United States Patent
Zhang et al.

(10) Patent No.: US 9,777,084 B2
(45) Date of Patent: *Oct. 3, 2017

(54) CATALYST SYSTEM FOR OLEFIN POLYMERIZATION AND METHOD FOR PRODUCING OLEFIN POLYMER

(71) Applicant: Formosa Plastics Corporation, USA, Livingston, NJ (US)

(72) Inventors: Lei Zhang, Port Lavaca, TX (US); Gapgoung Kong, Sugarland, TX (US); Chih-Jian Chen, Port Lavaca, TX (US); Demin Xu, Port Lavaca, TX (US); Yiqun Fang, Port Lavaca, TX (US); Guangxue Xu, Port Lavaca, TX (US)

(73) Assignee: Formosa Plastics Corporation, USA, Livingston, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,898

(22) Filed: Feb. 19, 2016

(65) Prior Publication Data

US 2017/0240667 A1   Aug. 24, 2017

(51) Int. Cl.
C08F 4/52 (2006.01)
C08F 4/64 (2006.01)
C08F 110/06 (2006.01)
B01J 31/02 (2006.01)
C08F 4/609 (2006.01)
B01J 31/38 (2006.01)

(52) U.S. Cl.
CPC ......... *C08F 110/06* (2013.01); *B01J 31/0204* (2013.01); *B01J 31/0247* (2013.01); *B01J 31/38* (2013.01); *C08F 4/6095* (2013.01)

(58) Field of Classification Search
CPC .... B01J 31/0204; B01J 31/0247; B01J 31/38; C08F 4/6095; C08F 4/607
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,220,554 A | 9/1980 | Scata et al. |
| 4,226,963 A | 10/1980 | Giannini et al. |
| 4,294,721 A | 10/1981 | Cecchin et al. |
| 4,315,835 A | 2/1982 | Scata et al. |
| 4,330,649 A | 5/1982 | Kioka et al. |
| 4,347,160 A | 8/1982 | Epstein et al. |
| 4,382,019 A | 5/1983 | Greco |
| 4,435,550 A | 3/1984 | Ueno et al. |
| 4,439,540 A | 3/1984 | Cecchin et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,816,433 A | 3/1989 | Terano et al. |
| 4,978,648 A * | 12/1990 | Barbe ............... C08F 10/00 502/126 |
| 5,106,807 A | 4/1992 | Morini et al. |
| 5,208,302 A | 5/1993 | Nakajo et al. |
| 5,407,883 A | 4/1995 | Fushimi et al. |
| 5,684,173 A | 11/1997 | Hosaka et al. |
| 5,902,765 A | 5/1999 | Takahashi et al. |
| 5,948,872 A | 9/1999 | Kioka et al. |
| 6,048,818 A | 4/2000 | Morini et al. |
| 6,121,483 A | 9/2000 | Fushimi et al. |
| 6,228,961 B1 | 5/2001 | Grison et al. |
| 6,281,301 B1 | 8/2001 | Morini et al. |
| 6,294,497 B1 | 9/2001 | Morini et al. |
| 6,313,238 B1 | 11/2001 | Morini et al. |
| 6,362,124 B1 | 3/2002 | Kuribayashi et al. |
| 6,395,670 B1 | 5/2002 | Morini et al. |
| 6,436,864 B1 | 8/2002 | Tagge |
| 6,552,136 B1 | 4/2003 | Ota et al. |
| 6,605,562 B1 * | 8/2003 | Morini ............... C07C 69/63 502/118 |
| 6,689,849 B1 | 2/2004 | Sadashima et al. |
| 6,716,939 B2 | 4/2004 | Morini et al. |
| 6,770,586 B2 | 8/2004 | Tashino et al. |
| 6,818,583 B1 | 11/2004 | Morini et al. |
| 6,825,309 B2 | 11/2004 | Morini et al. |

(Continued)

FOREIGN PATENT DOCUMENTS

WO   WO 2016/069676   * 5/2016   .............. C08K 5/20

*Primary Examiner* — Rip A Lee
(74) *Attorney, Agent, or Firm* — Jones Walker LLP

(57) ABSTRACT

A phthalate-free catalyst component for olefin polymerization comprising titanium, magnesium, a halogen, diether, and oxalic acid diamides represented by the following formula (I):

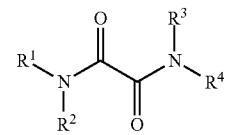

and an olefin polymerization catalyst system consisting of the solid catalyst component, an organoaluminum compound, and an optional external electron donor compound. The present catalyst compositions improve diether-based catalyst selectivity while maintaining excellent catalyst activity and hydrogen response. An olefin polymer that has a moderate molecular weight distribution while maintaining higher stereoregularity (isotacticity) over diether-based catalyst, and better than or equal to phthalate-based catalyst can be produced by utilizing the inventive catalyst component.

21 Claims, No Drawings

(56) References Cited

U.S. PATENT DOCUMENTS

| | | |
|---|---|---|
| 7,009,015 B2 | 3/2006 | Evain et al. |
| 7,022,640 B2 * | 4/2006 | Morini .................. C07C 41/16 502/103 |
| 7,049,377 B1 | 5/2006 | Morini et al. |
| 7,202,314 B2 * | 4/2007 | Morini .................. C08F 10/00 502/103 |
| 7,208,435 B2 | 4/2007 | Hosaka et al. |
| 7,223,712 B2 | 5/2007 | Morini et al. |
| 7,244,794 B2 | 7/2007 | Park et al. |
| 7,276,463 B2 * | 10/2007 | Sugano .................. C08F 10/06 502/103 |
| 7,351,778 B2 | 4/2008 | Gao et al. |
| 7,371,802 B2 | 5/2008 | Gulevich et al. |
| 7,491,781 B2 | 2/2009 | Uhrhammer et al. |
| 7,544,748 B2 | 6/2009 | Gulevich et al. |
| 7,619,049 B1 | 11/2009 | Fang et al. |
| 7,674,741 B2 | 3/2010 | Gulevich et al. |
| 7,674,943 B2 | 3/2010 | Uhrhammer et al. |
| 7,790,819 B1 | 9/2010 | Fang et al. |
| 7,888,437 B2 | 2/2011 | Matsunaga et al. |
| 7,888,438 B2 | 2/2011 | Matsunaga et al. |
| 7,935,766 B2 | 5/2011 | Sheard et al. |
| 7,964,678 B2 | 6/2011 | Wang et al. |
| 8,003,558 B2 | 8/2011 | Chang |
| 8,003,559 B2 | 8/2011 | Chang |
| 8,088,872 B2 | 1/2012 | Chen et al. |
| 8,211,819 B2 | 7/2012 | Chang |
| 8,222,357 B2 | 7/2012 | Chen |
| 8,227,370 B2 | 7/2012 | Chang |
| 8,236,908 B2 | 8/2012 | Hirahata et al. |
| 8,247,341 B2 | 8/2012 | Gonzalez et al. |
| 8,247,504 B2 | 8/2012 | Yano et al. |
| 8,263,520 B2 | 9/2012 | Coalter, III et al. |
| 8,263,692 B2 | 9/2012 | Sheard et al. |
| 8,288,304 B2 | 10/2012 | Chen et al. |
| 8,288,585 B2 | 10/2012 | Chen et al. |
| 8,318,626 B2 | 11/2012 | Chang |
| 8,383,540 B2 | 2/2013 | Chen et al. |
| 8,536,290 B2 | 9/2013 | Chen et al. |
| 8,569,195 B2 | 10/2013 | Chang |
| 8,575,283 B1 | 11/2013 | Fang et al. |
| 8,604,146 B2 | 12/2013 | Chen et al. |
| 8,614,162 B2 | 12/2013 | Coalter, III |
| 8,633,126 B2 | 1/2014 | Coalter, III et al. |
| 8,648,001 B2 | 2/2014 | Hosaka et al. |
| 8,664,142 B2 | 3/2014 | Kim et al. |
| 8,680,222 B2 | 3/2014 | Standaert et al. |
| 8,742,040 B2 | 6/2014 | Matsunaga et al. |
| 9,068,028 B2 | 6/2015 | Collina et al. |
| 2016/0115260 A1 * | 4/2016 | Kong .................. C08F 110/06 526/123.1 |

* cited by examiner

CATALYST SYSTEM FOR OLEFIN POLYMERIZATION AND METHOD FOR PRODUCING OLEFIN POLYMER

BACKGROUND

1. Field of the Invention

This invention relates to catalyst systems for producing phthalate free polypropylene with excellent activity, hydrogen response and high stereo-regularity, and also relates to method for producing a catalyst component and processes for producing polyolefins, particularly polypropylene.

2. Description of the Related Art

Ziegler-Natta catalyst systems for polyolefin polymerization are well known in the art. Commonly, these systems are composed of a solid Ziegler-Natta catalyst component and a co-catalyst component, usually an organoaluminum compound. To increase the activity and stereospecificity of the catalyst system for the polymerization of α-olefins, electron donating compounds have been widely used (1) as an internal electron donor in the solid Ziegler-Natta catalyst component, and/or (2) as an external electron donor to be used in conjunction with the solid Ziegler-Natta catalyst component and the co-catalyst component.

In the utilization of Ziegler-Natta type catalysts for polymerizations involving propylene or other olefins for which isotacticity is a possibility, it may be desirable to utilize an external electron donor, which may or may not be in addition to the use of an internal electron donor. Acceptable external electron donors include organic compounds containing O, Si, N, S, and/or P. Such compounds include organic acids, organic acid esters, organic acid anhydrides, ethers, ketones, alcohols, aldehydes, silanes, amides, amines, amine oxides, thiols, various phosphorus acid esters and amides, etc. Preferred external electron donors are organosilicon compounds containing Si—O—C and/or Si—N—C bonds, having silicon as the central atom. Such compounds are described in U.S. Pat. Nos. 4,472,524; 4,473,660; 4,560,671; 4,581,342; 4,657,882; 5,106,807; 5,407,883; 5,684,173; 6,228,961; 6,362,124; 6,552,136; 6,689,849; 7,009,015; 7,244,794; 7,276,463; 7,619,049; 7,790,819; 8,247,504; 8,648,001; and 8,614,162, which are incorporated by reference herein.

Common internal electron donor compounds, which are incorporated in the solid Ziegler-Natta catalyst component during preparation of such component, are known in the art and include ethers, esters, ketones, amines, alcohols, heterocyclic organic compounds, phenols, phosphines, and silanes. It is well known in the art that polymerization activity, as well as stereoregularity, molecular weight, and molecular weight distribution of the resulting polymer depend on the molecular structure of the internal electron donor employed. Therefore, in order to improve the polymerization process and the properties of the resulting polymer, there has been an effort and desire to develop various internal electron donors. Examples of such internal electron donor compounds and their use as a component of the catalyst system are described in U.S. Pat. Nos. 4,107,414; 4,186,107; 4,226,963; 4,347,160; 4,382,019; 4,435,550; 4,465,782; 4,522,930; 4,530,912; 4,532,313; 4,560,671; 4,657,882; 5,208,302; 5,902,765; 5,948,872; 6,048,818; 6,121,483; 6,281,301; 6,294,497; 6,313,238; 6,395,670; 6,436,864; 6,605,562; 6,716,939; 6,770,586; 6,818,583; 6,825,309; 7,022,640; 7,049,377; 7,202,314; 7,208,435; 7,223,712; 7,351,778; 7,371,802; 7,491,781; 7,544,748; 7,674,741; 7,674,943; 7,888,437; 7,888,438; 7,935,766; 7,964,678; 8,003,558; 8,003,559; 8,088,872; 8,211,819; 8,222,357; 8,227,370; 8,236,908; 8,247,341; 8,263,520; 8,263,692; 8,288,304; 8,288,585; 8,318,626; 8,383,540; 8,536,290 8,569,195; 8,575,283; 8,604,146; 8,633,126; 8,692,927; 8,664,142; 8,680,222; 8,742,040; and 9,068,028, which are incorporated by reference herein.

Most commercial propylene polymerization catalysts currently employ alkyl phthalate esters as an internal electron donor. However, certain environmental issues have been recently raised concerning the continued use of phthalate derivatives in human contact applications. These health concerns from phthalate exposure are driving the art to find a phthalate substitute, or phthalate-free catalyst composition. For example, malonic esters, succinic esters, and diether compounds have been employed as an internal donor for phthalate free catalyst components for propylene polymerization.

Recently, specific forms of diether compounds such as 9,9-bis(methoxymethyl)fluorine and its derivatives have been employed as an internal donor for the phthalate free catalyst component in propylene polymerization, drawing attention for its high activity, hydrogen response and moderate stereo-selectivity. Still, stereo-selectivity of catalyst components employing diether compounds only as an internal donor is not sufficient to reach the stereo-selectivity of catalyst systems containing phthalate or its derivatives, therefore expanding phthalate free polypropylene production via diether compounds has been limited. As such, there is still a need to develop a phthalate free catalyst system providing improved stereo-selectivity for propylene polymerization.

SUMMARY OF THE INVENTION

The present invention provides a method of preparing a Ziegler-Natta catalyst system containing oxalic acid diamide and diether compounds as internal electron donors for propylene polymerization, to produce a phthalate free polypropylene product with enhanced isotacticity, activity, and hydrogen response. The present invention also produces enhanced stereo-selectivity, overcoming the shortcomings of the catalyst systems containing diether compounds only as an internal donor.

In accordance with various aspects thereof, the present invention relates to a catalyst system for the polymerization or co-polymerization of alpha-olefins comprising a solid Ziegler-Natta type catalyst component, a co-catalyst component, and optionally an external electron donor component. The solid Ziegler-Natta type catalyst component of the present invention employs both oxalic acid diamide and diether compounds as internal electron donors for the polymerization of propylene. Oxalic acid diamides in the polymerization catalyst systems of the present invention are represented by Formula I:

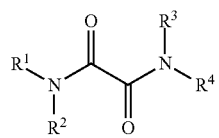

[Formula I]

wherein $R^1$, $R^2$, $R^3$, and $R^4$, which may be identical or different, are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms, wherein two or more of $R^1$, $R^2$, $R^3$, and $R^4$ may be linked to form one or more saturated or unsaturated monocyclic or polycyclic rings.

Diether compounds in the polymerization catalyst system of the present invention are represented by [Formula II];

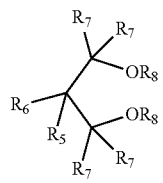

wherein $R^5$, $R^6$, $R^7$, and $R^8$ are independently selected from a hydrocarbon group having 1 to 20 carbon atoms, or an aromatic hydrocarbon group having 6-20 carbon atoms which can form one or more cyclic structures.

DESCRIPTION OF PREFERRED EMBODIMENTS

The present invention relates to polymerization catalyst systems employing both oxalic acid diamide, and diether compounds as internal electron donors, and to methods of making the polymerization catalyst systems, and to polymerization processes to produce polyolefins, particularly polypropylene, which exhibit enhanced stereo-specificity, activity, and hydrogen response.

In accordance with certain embodiments of the present invention, employing both oxalic acid diamides and diethers as internal electron donor compounds in polymerization catalyst systems for the production of polyolefins, particularly polypropylene, are disclosed. According to certain aspects of the present invention, the oxalic acid diamides that may be used as a component of internal electron donors in polymerization catalyst systems, are represented by Formula I:

[Formula I]

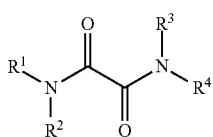

wherein $R^1$, $R^2$, $R^3$, and $R^4$ may be identical or different, are independently hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms, wherein two or more of $R^1$, $R^2$, $R^3$, and $R^4$ may be linked to form one or more saturated or unsaturated monocyclic or polycyclic rings.

Preferred examples of suitable oxalic acid diamides of the Formula I include, but are not limited to:

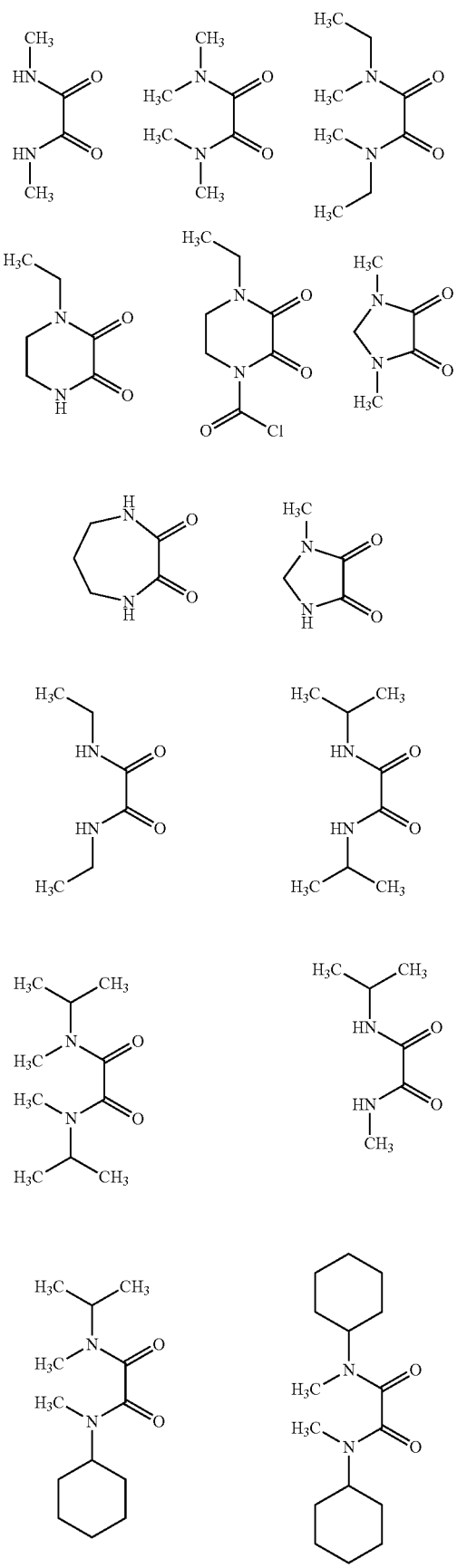

-continued

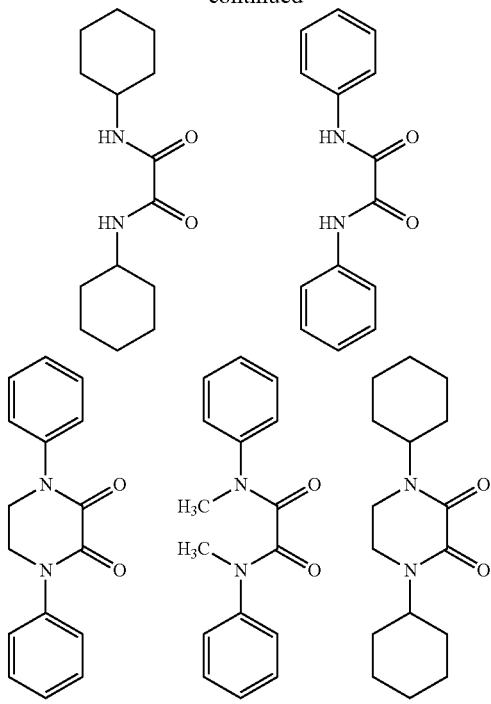

According to certain aspects of the present invention, diether compounds that may be used as a component of internal electron donors in polymerization catalyst systems, are represented by Formula II:

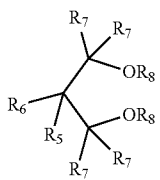

wherein $R^5$, $R^6$, $R^7$, and $R^8$ are independently selected from a hydrocarbon group having 1 to 20 carbon atoms, or an aromatic hydrocarbon group having 6-20 carbon atoms which can form one or more cyclic structures.

Examples of diethers that can be used include, but are not limited to: 2-(2-ethylhexyl) 1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexyl ethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohexylmethyl-1,3-dimethoxypropane.

According to certain aspects of the present invention, preferred diether compounds that may be used as a component of internal electron donors in polymerization catalyst systems, are represented by Formula III:

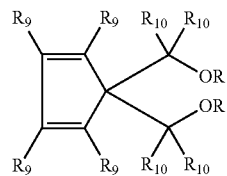

wherein $R_9$ is selected from hydrogen, halogens, preferably Cl or F; C1-C20 alkyl group, linear or branched. $R_9$ optionally contains one or more heteroatoms selected from the group consisting of N, O, S, P, Si and halogens; R and $R_{10}$ are independently selected from a hydrocarbon group having 1 to 20 carbon atoms, or an aromatic hydrocarbon group having 6-20 carbon atoms which can form one or more cyclic structures.

Examples of compounds comprised in Formula III include, but are not limited to: 1,1-bis(methoxymethyl)-cyclopentadiene; 1,1-bis(methoxymethyl)-2,3,4,5-tetramethyl cyclopentadiene; 1,1-bis(methoxymethyl)-2,3,4,5-tetraphenylcyclopentadiene; 1,1-bis(methoxymethyl)-2,3,4,5-tetrafluorocyclopentadiene; 1,1-bis(methoxymethyl)-3,4-dicyclopentylcyclopentadiene; 1,1-bis(methoxymethyl)indene; 1,1-bis(methoxymethyl)-2,3-dimethylindene; 1,1-bis(methoxymethyl)-4,5,6,7-tetrahydroindene; 1,1-bis(methoxymethyl)-2,3,6,7-tetrafluoroindene; 1,1-bis(methoxymethyl)-4,7-dimethylindene; 1,1-bis(methoxymethyl)-3,6-dimethylindene; 1,1-bis(methoxymethyl)-4-phenylindene; 1,1-bis(methoxymethyl)-4-phenyl-2-methylindene; 1,1-bis(methoxymethyl)-4-cyclohexylindene; 1,1-bis(methoxymethyl)-7-(3,3,3-trifluoropropyl)indene; 1,1-bis(methoxymethyl)-7-trimethyisilylindene; 1,1-bis(methoxymethyl)-7-trifluoromethylindene; 1,1-bis(methoxymethyl)-4,7-dimethyl-4,5,6,7-tetrahydroindene; 1,1-bis(methoxymethyl)-7-methylindene; 1,1-bis(methoxymethyl)-7-cyclopenthylindene; 1,1-bis(methoxymethyl)-7-isopropylindene; 1,1-bis(methoxymethyl)-7-cyclohexylindene; 1,1-bis (methoxymethyl)-7-tert-butylindene; 1,1-bis(methoxymethyl)-7-tert-butyl-2-methylindene; 1,1-bis(methoxymethyl)-7-phenylindene; 1,1-bis(methoxymethyl)-2-phenylindene; 1,1-bis(methoxymethyl)-1H-benz[e]indene; 1,1-bis(methoxymethyl)-1H-2-methylbenz[e]indene According to certain aspects of the present invention, the most preferred diether compounds that may be used as a component of internal electron donors in polymerization catalyst systems, are represented by Formula IV;

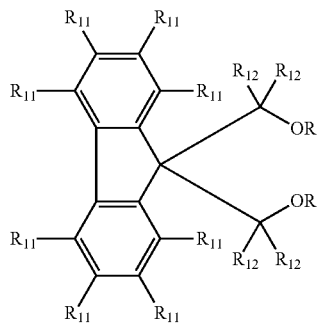

wherein $R_{11}$ is selected from hydrogen, halogens, preferably Cl or F; C1-C20 alkyl group, linear or branched; and optionally containing one or more heteroatoms selected from the group consisting of N, O, S, P, Si and halogens; R and $R_{12}$ are independently selected from a hydrocarbon group having 1 to 20 carbon atoms, or an aromatic hydrocarbon group having 6-20 carbon atoms which can form one or more cyclic structures.

Specific examples of compounds comprised in Formulae IV include, but are not limited to; 9,9-bis(methoxymethyl)fluorene; 9,9-bis(methoxymethyl)-2,3,6,7-tetramethylfluorene; 9,9-bis(methoxymethyl)-2,3,4,5,6,7-hexafluorofluorene; 9,9-bis(methoxymethyl)-2,3-benzofluorene; 9,9-bis(methoxymethyl)-2,3,6,7-dibenzofluorene; 9,9-bis(methoxymethyl)-2,7-diisopropylfluorene; 9,9-bis(methoxymethyl)-1,8-dichlorofluorene; 9,9-bis(methoxymethyl)-2,7-dicyclopentylfluorene; 9,9-bis(methoxymethyl)-1,8-difluorofluorene; 9,9-bis(methoxymethyl)-1,2,3,4-tetrahydrofluorene; 9,9-bis(methoxymethyl)-1,2,3,4,5,6,7,8-octahydrofluorene; 9,9-bis(methoxymethyl)-4-tert-butylfluorene.

Diether compounds represented by Formula II, III, and IV can also be employed in combination with succinate compounds represented by Formula V as mixed internal donors;

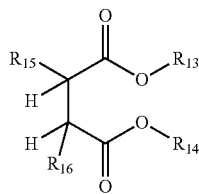

wherein R13 and R14 are independently selected from C1-C20 linear or branched alkyl, alkenyl, cycloalkyl, arylarylalkyl or alkylaryl groups, optionally containing heteroatoms; and $R_{15}$ and $R_{16}$ are independently selected from C1-C20 alkyl, C3-C20 cycloalkyl, C5-C20 aryl, arylalkyl or alkylaryl groups, with the proviso that at least one of $R_{15}$ or $R_{16}$ is a branched alkyl.

Particularly preferred examples of the above-mentioned compounds are diethyl 2,3-bis(trimethylsilyl)succinate, diethyl 2,3-bis(2-ethylbutyl)succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, diethyl 2,3-dicyclohexylsuccinate.

Ziegler-Natta type catalyst systems that may be used in accordance with the present invention comprise (a) a solid Ziegler-Natta type catalyst component, (b) a co-catalyst component, and optionally (c) one or more external electron donors.

Preferred solid Ziegler-Natta type catalyst component (a) include solid catalyst components comprising a titanium compound having at least a Ti-halogen bond and an internal electron donor compounds supported on an anhydrous magnesium-dihalide support. Such preferred solid Ziegler-Natta type catalyst components (a) include solid catalyst components comprising a titanium tetrahalide. A preferred titanium tetrahalide is $TiCl_4$. Alkoxy halides may also be used solid Ziegler-Natta type catalyst component (a).

Acceptable anhydrous magnesium dihalides forming the support of the solid Ziegler-Natta type catalyst component (a) are the magnesium dihalides in active form that are well known in the art. Such magnesium dihalides may be preactivated, may be activated in situ during the titanation, may be formed in-situ from a magnesium compound, which is capable of forming magnesium dihalide when treated with a suitable halogen-containing transition metal compound, and then activated. Preferred magnesium dihalides are magnesium dichloride and magnesium dibromide. The water content of the dihalides is generally less than 1% by weight.

The solid Ziegler-Natta type catalyst component (a) may be made by various methods. One such method consists of co-grinding the magnesium dihalide and the internal electron donor compounds until the product shows a surface area higher than 20 $m^2/g$ and thereafter reacting the ground product with the Ti compound. Other methods of preparing solid Ziegler-Natta type catalyst component (a) are disclosed in U.S. Pat. Nos. 4,220,554; 4,294,721; 4,315,835; 4,330,649; 4,439,540; 4,816,433; and 4,978,648. These methods are incorporated herein by reference.

In a typical solid Ziegler-Natta type catalyst component (a), the molar ratio between the magnesium dihalide and the halogenated titanium compound is between 1 and 500, the molar ratio between said halogenated titanium compound and mixture of internal electron donor compounds is between 0.1 and 50, and the molar ratio between said the oxalic acid diamide modifier, and malonic acid ester compound is between 0.1 and 100, the molar ratio between said the oxalic acid diamide modifier, and silicon ester compound is between 0.1 and 100.

Preferred co-catalyst component (b) includes aluminum alkyl compounds. Acceptable aluminum alkyl compounds include aluminum trialkyls, such as aluminum triethyl, aluminum triisobutyl, and aluminum triisopropyl. Other acceptable aluminum alkyl compounds include aluminum-dialkyl hydrides, such as aluminum-diethyl hydrides. Other acceptable co-catalyst component (b) include compounds containing two or more aluminum atoms linked to each other through hetero-atoms, such as:

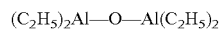

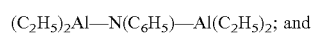

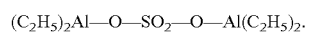

Acceptable external electron donor component (c) is organic compounds containing O, Si, N, S, and/or P. Such compounds include organic acids, organic acid esters, organic acid anhydrides, ethers, ketones, alcohols, aldehydes, silanes, amides, amines, amine oxides, thiols, various phosphorus acid esters and amides, etc. Preferred component (c) is organosilicon compounds containing Si—O—C and/or Si—N—C bonds. Special examples of such organosilicon compounds are trimethylmethoxysilane, diphenyldimethoxysilane, cyclohexylmethyldimethoxysilane, diisopropyldimethoxysilane, dicyclopentyldimethoxysilane, isobutyltriethoxysilane, vinyltrimethoxysilane, dicyclohexyldimethoxysilane, 3-tert-Butyl-2-isobutyl-2methoxy-[1,3,2]oxazasilolidine, 3-tert-Butyl-2-cyclopentyl-2-methoxy-[1,3,2]oxazasilolidine, 2-Bicyclo[2.2.1]hept-5-en-2-yl-3-tert-butyl-2-methoxy-[1,3,2]oxazasilolidine, 3-tert-Butyl-2,2-diethoxy-[1,3,2]oxazasilolidine, 4,9-Di-tert-butyl-1,6-dioxa-4,9-diaza-5-sila-spiro[4.4]nonane, bis(perhydroisoquinolino)dimethoxysilane, etc. Mixtures of organic electron donors may also be used. Finally, the oxalic acid diamides of the present invention may also be employed as an external electronic donor.

The olefin polymerization processes that may be used in accordance with the present invention are not generally limited. For example, the catalyst components (a), (b) and (c), when employed, may be added to the polymerization reactor simultaneously or sequentially. It is preferred to mix components (b) and (c) first and then contact the resultant mixture with component (a) prior to the polymerization.

The olefin monomer may be added prior to, with, or after the addition of the Ziegler-Natta type catalyst system to the polymerization reactor. It is preferred to add the olefin monomer after the addition of the Ziegler-Natta type catalyst system.

The molecular weight of the polymers may be controlled in a known manner, preferably by using hydrogen. With the catalysts produced according to the present invention, molecular weight may be suitably controlled with hydrogen when the polymerization is carried out at relatively low temperatures, e.g., from about 30° C. to about 105° C. This control of molecular weight may be evidenced by a measurable positive change of the Melt Flow Rate.

The polymerization reactions may be carried out in slurry, liquid or gas phase processes, or in a combination of liquid and gas phase processes using separate reactors, all of which may be done either by batch or continuously. The polyolefin may be directly obtained from gas phase process, or obtained by isolation and recovery of solvent from the slurry process, according to conventionally known methods.

There are no particular restrictions on the polymerization conditions for production of polyolefins by the method of this invention, such as the polymerization temperature, polymerization time, polymerization pressure, monomer concentration, etc. The polymerization temperature is generally from 40-90° C. and the polymerization pressure is generally 1 atmosphere or higher.

The Ziegler-Natta type catalyst systems of the present invention may be pre-contacted with small quantities of olefin monomer, well known in the art as pre-polymerization, in a hydrocarbon solvent at a temperature of 60° C. or lower for a time sufficient to produce a quantity of polymer from 0.5 to 3 times the weight of the catalyst. If such a pre-polymerization is done in liquid or gaseous monomer, the quantity of resultant polymer is generally up to 1000 times the catalyst weight.

The Ziegler-Natta type catalyst systems of the present invention are useful in the polymerization of olefins, including but not limited to homopolymerization and copolymerization of alpha olefins. Suitable α-olefins that may be used in a polymerization process in accordance with the present invention include olefins of the general formula $CH_2=CHR$, where R is H or $C_{1-10}$ straight or branched alkyl, such as ethylene, propylene, butene-1, pentene-1,4-methylpentene-1 and octene-1. While the Ziegler-Natta type catalyst systems of the present invention may be employed in processes in which ethylene is polymerized, it is more desirable to employ the Ziegler-Natta type catalyst systems of the present invention in processes in which polypropylene or higher olefins are polymerized. Processes involving the homopolymerization or copolymerization of propylene are preferred.

EXAMPLES

In order to provide a better understanding of the foregoing, the following non-limiting examples are offered. Although the examples may be directed to specific embodiments, they are not to be viewed as limiting the invention in any specific respect. The activity values (AC) are based upon grams of polymer produced per gram of solid catalyst component used.

The following analytical methods are used to characterize the polymer.

Heptane Insolubles (% HI): The weight percent (wt %) of residuals of polypropylene sample after extracted with boiling heptane for 8 hours.

Melt flow rate (MI): ASTM D-1238, determined at 230° C. under the load of 2.16 kg.

Melt point ($T_m$): ASTM D-3417, determined by DSC (Manufacturer: TA Instrument, Inc; Model: DSC Q1000).

Determination of Isotactic Pentads Content: Place 400 mg of polymer sample into 10 mm NMR tube. 1.7 g TCE-d2 and 1.7 g o-DCB were added into the tube. $^{13}C$ NMR spectra were acquired on a Bruker AVANCE 400 NMR (100.61 MHz, 90° pulse, 12 s delay between pulse). About 5000 transients were stored for each spectrum; mmmm pentad peak (21.09 ppm) was used as reference. The microstructure analysis was carried out as described in literature (Macromolecules, 1994, 27, 4521-4524, by V. Busico, et al.)

Molecular weight (Mn and Mw): The weight average molecular weight (Mw), number average molecular weight (Mw), and molecular weight distribution (Mw/Mn) of polymers were obtained by gel permeation chromatography on Water 2000GPCV system using Polymer Labs Plgel 10 um MIXED-B LS 300×7.5 mm columns and 1,2,4-trichlorobenzene (TCB) as mobile phase. The mobile phase was set at 0.9 ml/min, and temperature was set at 145° C. Polymer samples were heated at 150° C. for two hours. Injection volume was 200 microliters. External standard calibration of polystyrene standards was used to calculate the molecular weight.

Magnesium ethoxide (98%), anhydrous toluene (99.8%), $TiCl_4$ (99.9%), anhydrous n-heptane (99%), diisobutyl phthalate (99%), cyclohexyl(dimethoxy)methylsilane (C-donor, ≥99%) and triethylaluminum (93%) were all purchased from Sigma-Aldrich Co. of Milwaukee, Wis., USA.

Diisopropyldimethoxysilane (P-donor), and dicyclopentyldimethoxysilane (D-donor) were purchased from Gelest, Inc. of Morrisville, Pa., USA.

1-Ethyl-2,3-piperazinedione were purchased from TCI America.

Unless otherwise indicated, all reactions were conducted under an inert atmosphere.

Examples 1-6

(A) the Preparation of a Solid Catalyst Component A1

To a three-neck 250 ml flask equipped with fritted filter disc, which is thoroughly purged with anhydrous nitrogen, 9.2 g of magnesium ethoxide, 0.22 g of N-ethyl-2,3-dioxopiperazine, and 80 ml of anhydrous toluene was introduced to form a suspension. 20 ml of TiCl4 was added through a stainless steel cannula. The temperature of the mixture was gradually raised to 90° C., and 8.5 mmol of 9,9-bis(methoxymethyl)fluorine was added. The temperature of the mixture was increased to 110° C., and maintained for 2 hours with stirring. The resulting solid was filtered and washed twice with 100 ml of anhydrous toluene at 90° C., and then 80 ml of fresh anhydrous toluene and 20 ml TiCl$_4$ was added to the filtered solid. Temperature of the mixture was heated to 110° C., and stirred for 2 hours. The solid was filtered and residual solid was washed with heptane 7 times at 70° C. The final catalyst was collected and dried under vacuum to obtain a solid catalyst component (A1).

(B) Propylene Slurry Polymerization

Propylene polymerization was conducted in a bench scale 2-liter reactor per the following procedure. The reactor was first preheated to at least 100° C. with a nitrogen purge to remove residual moisture and oxygen. The reactor was thereafter cooled to 50° C. Under nitrogen, 1 liter dry heptane was introduced into the reactor. When reactor temperature was about 50° C., 4.3 ml of triethylaluminum (0.58M, in hexanes), 0.4-1.6 ml of cyclohexyl(dimethoxy)methylsilane (C-donor) (0.5 M in heptane) or 0.4-1.6 ml of diisopropyl(dimethoxy)silane (P-donor) (0.5 M in heptane), and then 30 mg of the solid catalyst component (A1) prepared above were added to the reactor. The temperature of the reactor was heated to 50° C. and 8 psi of hydrogen in a 150 ml vessel was flushed into the reactor with propylene.

The reactor temperature was then raised to 70° C. The total reactor pressure was raised to and controlled at 90 psig by continually introducing propylene into the reactor and the polymerization was allowed to proceed for 1 hour. After polymerization, the reactor was vented to reduce the pressure to 0 psig and the reactor temperature was cooled to 50° C.

The reactor was then opened. 500 ml methanol was added to the reactor and the resulting mixture was stirred for 5 minutes then filtered to obtain the polymer product. The obtained polymer was vacuum dried at 80° C. for 6 hours. The polymer was evaluated for melt flow rate (MFR), heptane insoluble (HI %), and mmmm %. The activity of catalyst (AC) was also measured. The results are shown in TABLE 1.

(C) Propylene Bulk Polymerization

Propylene polymerization was conducted in a bench scale 1 gallon reactor per the following procedure. The reactor was first preheated to at least 100° C. with a nitrogen purge to remove residual moisture and oxygen. The reactor was thereafter cooled to 50° C. Under nitrogen, 14 ml of triethylaluminum (0.58M, in hexanes), 0.25 mmol of diisopropyldimethoxysilane was charged. After addition of hydrogen and 2.0 liter of liquefied propylene, temperature was raised to 70° C., then 15 mg of solid catalyst component prepared above was flushed with propylene to start polymerization. The polymerization was conducted for 1 hour at 70° C. The polymer was evaluated for melt flow rate (MFR), heptane insoluble (HI %), and mmmm % from $^{13}$C NMR. The activity of catalyst (AC) was also measured. The results are shown in TABLE 2.

Comparative Examples 1-6

(A) the Preparation of a Solid Catalyst Component C1

Preparation of the solid catalyst component was carried out in the same as Examples 1-6 except that N-ethyl-2,3-dioxopiperazine was not introduced to make a solid catalyst component and 10.0 mmol of 9,9-bis(methoxymethyl)fluorine was added (C1)

(B) Propylene Slurry Polymerization

Propylene polymerization was carried out in the same manner as described in Examples 1-6 except that solid catalyst component (C1) was used instead of solid catalyst component (A1). The results are summarized in TABLE 1.

(C) Propylene Bulk Polymerization

Propylene polymerization was carried out in the same manner as described in Example 1 except that solid catalyst component (C1) was used instead of solid catalyst component (A1). The results are summarized in TABLE 2.

Comparative Examples 7-9

(A) the Preparation of a Solid Catalyst Component C2

To a three-neck 250 ml flask equipped with fritted filter disc, which is thoroughly purged with anhydrous nitrogen, 9.2 g of magnesium ethoxide, and 80 ml of anhydrous toluene was introduced to form a suspension. 20 ml of TiCl$_4$ was added through a stainless steel cannula. The temperature of the mixture was gradually raised to 90° C., and 10.0 mmol of diisobutylphthalate was added. The temperature of the mixture was increased to 110° C., and maintained for 2 hours with stirring. The resulting solid was filtered and washed twice with 100 ml of anhydrous toluene at 90° C., and then 80 ml of fresh anhydrous toluene and 20 ml TiCl$_4$ was added to the filtered solid. Temperature of the mixture was heated to 110° C., and stirred for 2 hours. The solid was filtered and residual solid was washed with heptane 7 times at 70° C. The final solid catalyst was collected and dried under vacuum to obtain a solid catalyst component (C2).

(B) Propylene Slurry Polymerization

Propylene polymerization was carried out in the same manner as described in Examples 1-6 except that solid catalyst component (C2) was used instead of solid catalyst component (A1) and 0.4 or 0.8 mmol of diisopropyl(dimethoxy)silane (P-donor) (0.5 M in heptane) was added as an external donor. The results are summarized in TABLE 1.

(C) Propylene Bulk Polymerization

Propylene polymerization was carried out in the same manner as described in Example 1 except that solid catalyst component (C1) was used instead of solid catalyst component (A1). The results are summarized in TABLE 2.

TABLE 1

(Slurry polymerization)

| Catalyst component | Examples | External Donor | External donor (mmol) | Activity (gPP/gcat) | MFR (g/10 min) | HI % | mmmm % |
|---|---|---|---|---|---|---|---|
| A1 | Ex 1 | P donor | 0.4 | 5400 | 7.6 | 98.9 | 96.8 |
| " | Ex 2 | P donor | 0.8 | 4800 | 6.9 | 99.0 | 97.0 |
| " | Ex 3 | C donor | 0.4 | 5920 | 7.6 | 98.6 | |
| " | Ex 4 | C donor | 0.8 | 4754 | 7.0 | 99.0 | |
| C1 | Comp Ex 1 | P donor | 0.4 | 6227 | 5.0 | 98.3 | 96.0 |
| " | Comp Ex 2 | P donor | 0.8 | 5750 | 4.8 | 98.6 | 96.6 |
| " | Comp Ex 3 | C donor | 0.4 | 5967 | 6.6 | 98.4 | |
| " | Comp Ex 4 | C donor | 0.8 | 5820 | 4.3 | 98.7 | |
| C2 | Comp Ex 7 | P donor | 0.4 | 5944 | 2.2 | 99.0 | 96.6 |
| " | Comp Ex 8 | P donor | 0.8 | 5534 | 2.0 | 99.1 | 97.0 |

TABLE 2

(Bulk polymerization)

| Catalyst component | Examples | External donor (mmol) | H₂ (mg) | Activity (gPP/gcat) | MFR (g/10 min) | HI % | MWD |
|---|---|---|---|---|---|---|---|
| A1 | Ex 5 | P 0.25 | 200 | 36334 | 23.7 | 96.5 | 3.9 |
| " | Ex 6 | P 0.25 | 80 | 31000 | 8.1 | 97.4 | |
| C1 | Comp Ex 5 | P 0.25 | 200 | 38934 | 24.8 | 95.4 | 4.0 |
| " | Comp Ex 6 | P 0.25 | 80 | 36600 | 7.9 | 96.5 | |
| C2 | Comp Ex 9 | P 0.25 | 200 | 36000 | 10.4 | 97.0 | 4.6 |

As is clear from the above results shown in Table 1 and Table 2, the solid catalyst system according to present invention employing oxalic acid diamide (1-ethyl-2,3-piperazinedione) and a diether donor, has achieved enhanced isotacticity in polypropylene production over the catalyst system that contains only diether donor, while maintaining high activity and excellent hydrogen response in both slurry and bulk polymerization.

For example, in Table 1, A1 catalyst component obtained according to the present invention in the presence of P donor (diisopropyldimethoxysilane), produced PP with a % HI of 98.9~99.0 and mmmm % 96.8~97.0 of Ex 1 and Ex 2, which is much higher than those (% HI of 98.3~98.6 and mmmm % 96.0~96.6%) by the diether-only system (C1 catalyst component) of Comp Ex. 1 and Comp Ex. 2. Also, in the presence of C donor (cyclohexylmethyldimethoxysilane), the A1 catalyst component produced PP with % HI 98.6~99.0 of Ex. 3 and Ex. 4, whereas C1 catalyst component produced PP with % HI 98.4~98.7 of comp Ex. 3 and Comp. Ex. 4. Also, in bulk polymerization shown in Table 2, A1 catalyst according to present invention has produced PP with enhanced isotacticity (HI % 96.5~97.4 of Ex5 and Ex6) over those (HI % 95.4~96.5 of comp Ex. 5 and Comp. Ex. 6) by C1 catalyst containing diether donor only.

Even the polypropylene produced by phthalate free catalyst (A1 catalyst) of the present invention has reached isotacticity (% HI 98.9~99.0 of Ex. 1 and Ex. 2) as high as those (% HI 99.0~99.1 of comp Ex. 7 and Comp. Ex. 8) produced by phthalate catalyst (C2 catalyst) in slurry polymerization as shown Table 1 and also in bulk polymerization shown in Table 2, isotacticity (% HI 96.5~97.4, Ex. 5 and Ex. 6) of polypropylene produced by A1 catalyst has reached equivalent level of those (% HI 97.0, Comp. Ex. 9)) by phthalate catalyst system (C2 catalyst). Thus, the embodiment of the present invention provides a phthalate free catalyst system producing polypropylene with enhanced isotacticity, activity and excellent hydrogen response.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Whenever a numerical range with a lower limit and an upper limit is disclosed, any number falling within the range is specifically disclosed. Moreover, the indefinite articles "a" or "an", as used in the claims, are defined herein to mean one or more than one of the element that it introduces.

What is claimed is:

1. A solid catalyst component for the polymerization or co-polymerization of alpha-olefins comprising a solid Ziegler Natta catalyst component comprising one or more oxalic acid diamide compounds and one or more diether compounds.

2. The solid catalyst component of claim 1, wherein the one or more oxalic acid diamide compounds are selected from compounds of the general formula:

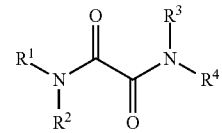

wherein $R^1$, $R^2$, $R^3$, and $R^4$ are independently selected from hydrogen, an aliphatic hydrocarbon group having 1-20 carbon atoms, an alicyclic hydrocarbon group having 3-20 carbon atoms, an aromatic hydrocarbon group having 6-20 carbon atoms, or a hetero atom containing a hydrocarbon group of 1-20 carbon atoms; and wherein two or more of $R^1$, $R^2$, $R^3$, and $R^4$ may be linked to form one or more saturated or unsaturated monocyclic or polycyclic rings.

3. The solid catalyst component of claim 1, wherein the one or more diether compounds are selected from compounds of general formula:

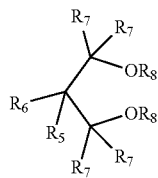

wherein $R^5$, $R^6$, $R^7$ and $R^8$ are independently selected from a hydrocarbon group having 1-20 carbon atoms or an aromatic hydrocarbon group having 6-20 carbon atoms;

wherein two or more of $R^5$, $R^6$, $R^7$, and $R^8$ may be linked to form one or more saturated or unsaturated monocyclic or polycyclic rings.

4. The solid catalyst component of claim 1, the one or more diether compounds are selected from compounds of general formula:

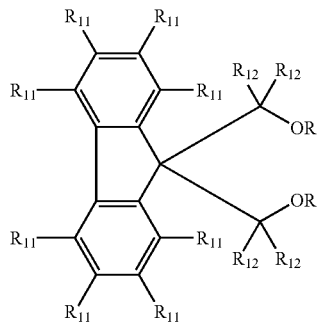

wherein $R^{11}$ are independently selected from hydrogen, a halogen, an alkyl group having 1-20 carbon atoms, or a heteroatom containing a hydrocarbon group of 1-20 carbon atoms; and wherein R and $R^{12}$ are independently selected from a hydrocarbon group having 1-20 carbon atoms or an aromatic hydrocarbon group having 6-20 carbon atoms.

5. The solid catalyst component of claim 1, wherein the one or more diether compounds are selected from: 9,9-bis(methoxymethyl)fluorene; 9,9-bis(methoxymethyl)-2,3,6,7-tetramethylfluorene; 9,9-bis(methoxymethyl)-2,3,4,5,6,7-hexafluorofluorene; 9,9-bis(methoxymethyl)-2,3-benzofluorene; 9,9-bis(methoxymethyl)-2,3,6,7-dibenzofluorene; 9,9-bis(methoxymethyl)-2,7-diisopropylfluorene; 9,9-bis(methoxymethyl)-1,8-dichlorofluorene; 9,9-bis(methoxymethyl)-2,7-dicyclopentylfluorene; 9,9-bis(methoxymethyl)-1,8-difluorofluorene; 9,9-bis(methoxymethyl)-1,2,3,4-tetrahydrofluorene; 9,9-bis(methoxymethyl)-1,2,3,4,5,6,7,8-octahydrofluorene; 9,9-bis(methoxymethyl)-4-tert-butylfluorene.

6. The solid catalyst component of claim 2, wherein the one or more oxalic diamides is 1-ethyl-2,3-dioxopiperazine.

7. The solid catalyst component of claim 1, wherein oxalic acid diamide and diether compounds are employed in conjunction with succinate compounds represented by the formula:

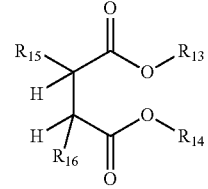

wherein $R^{13}$ and $R^{14}$ are independently selected from C1-C20 linear or branched alkyl, alkenyl, cycloalkyl, arylarylalkyl or alkylaryl groups; and wherein $R^{15}$ and $R^{16}$ are independently selected from C1-C20 alkyl, C3-C20 cycloalkyl, C5-C20 aryl, arylalkyl, or alkylaryl groups, wherein at least one of $R^{15}$ and $R^{16}$ is a branched alkyl.

8. The solid catalyst component of claim 1, wherein oxalic acid diamide and diether compounds are employed in conjunction with succinate compounds selected from diethyl 2,3-bis(trimethylsilyl)succinate, diethyl 2,3-bis(2-ethylbutyl) succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, or diethyl 2,3-dicyclohexylsuccinate.

9. A catalyst system for the polymerization or co-polymerization of alpha-olefins comprising:

(a) A solid catalyst component for the polymerization or co-polymerization of alpha-olefins comprising a solid Ziegler Natta type catalyst component comprising one or more oxalic acid diamide compounds and one or more diether compounds; and (b) a co-catalyst component comprising an organoaluminum compound represented by a general formula:

wherein R represents an alkyl group having 1 to 6 carbon atoms, Q represents a hydrogen or a halogen atom, and n represents a real number that satisfies $0 \leq n \leq 3$.

10. The catalyst system of claim 9, further comprising one or more external electron donor components.

11. The catalyst system of claim 9, wherein the one or more oxalic acid diamide compounds are selected from compounds the general formula:

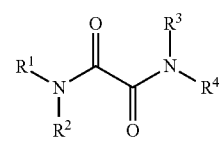

wherein $R^1$, $R^2$, $R^3$, and $R^4$ are independently selected from hydrogen, an aliphatic hydrocarbon group having 1-20 carbon atoms, an alicyclic hydrocarbon group having 3-20 carbon atoms, an aromatic hydrocarbon group having 6-20 carbon atoms, or a hetero atom containing a hydrocarbon group of 1-20 carbon atoms.

12. The catalyst system of claim 9, wherein the one or more diether compounds are selected from compounds of general formula:

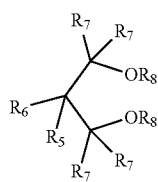

wherein $R^5$, $R^6$, $R^7$, and $R^8$ are independently selected from a hydrocarbon group having 1-20 carbon atoms or an aromatic hydrocarbon group having 6-20 carbon atoms.

13. The catalyst system of claim 9, wherein the one or more diether compounds are selected from compounds of general formula:

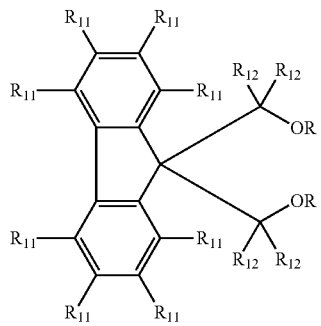

wherein $R^{11}$ are independently selected from hydrogen, a halogen, an alkyl group having 1-20 carbon atoms, or a heteroatom containing a hydrocarbon group of 1-20 carbon atoms; and wherein R and $R^{12}$ are independently selected from a hydrocarbon group having 1-20 carbon atoms or an aromatic hydrocarbon group having 6-20 carbon atoms.

14. The solid catalyst component of claim 9, wherein the one or more diether compounds are selected from: 9,9-bis(methoxymethyl)fluorene; 9,9-bis(methoxymethyl)-2,3,6,7-tetramethylfluorene; 9,9-bis(methoxymethyl)-2,3,4,5,6,7-hexafluorofluorene; 9,9-bis(methoxymethyl)-2,3-benzofluorene; 9,9-bis(methoxymethyl)-2,3,6,7-dibenzofluorene; 9,9-bis(methoxymethyl)-2,7-diisopropylfluorene; 9,9-bis(methoxymethyl)-1,8-dichlorofluorene; 9,9-bis(methoxymethyl)-2,7-dicyclopentylfluorene; 9,9-bis(methoxymethyl)-1,8-difluorofluorene; 9,9-bis(methoxymethyl)-1,2,3,4-tetrahydrofluorene; 9,9-bis(methoxymethyl)-1,2,3,4,5,6,7,8-octahydrofluorene; 9,9-bis(methoxymethyl)-4-tert-butylfluorene.

15. The solid catalyst component of claim 9, wherein the one or more oxalic diamides is 1-ethyl-2,3-dioxopiperazine.

16. The solid catalyst component of claim 9, wherein oxalic acid diamide and diether compounds are employed in conjunction with succinate compounds represented by the formula:

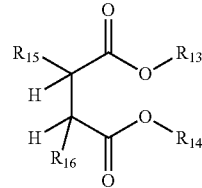

wherein $R^{13}$ and $R^{14}$ are independently selected from C1-C20 linear or branched alkyl, alkenyl, cycloalkyl, arylarylalkyl or alkylaryl groups; and wherein $R^{15}$ and $R^{16}$ are independently selected from C1-C20 alkyl, C3-C20 cycloalkyl, C5-C20 aryl, arylalkyl, or alkylaryl groups, wherein at least one of $R^{15}$ and $R^{16}$ is a branched alkyl.

17. The solid catalyst component of claim 9, wherein oxalic acid diamide and diether compounds are employed in conjunction with succinate compounds selected from diethyl 2,3-bis(trimethylsilyl)succinate, diethyl 2,3-bis(2-ethylbutyl) succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, or diethyl 2,3-dicyclohexylsuccinate.

18. The solid catalyst component of claim 11, wherein two or more of $R^1$, $R^2$, $R^3$, and $R^4$ may be linked to form one or more saturated or unsaturated monocyclic or polycyclic rings.

19. The solid catalyst component of claim 12, wherein two or more of $R^5$, $R^6$, $R^7$, and $R^8$ may be linked to form one or more saturated or unsaturated monocyclic or polycyclic rings.

20. A method for polymerizing alpha-olefins, comprising: polymerizing alpha-olefins in the presence of:
(a) a solid catalyst component for the polymerization or co-polymerization of alpha-olefins comprising a solid Ziegler Natta type catalyst component comprising one or more oxalic acid diamide compounds and one or more 1,3 diether compounds;
(b) a co-catalyst component comprising an organoaluminum compound represented by a general formula:

$R_nAlQ_{3-n}$ wherein R represents an alkyl group having 1 to 6 carbon atoms, Q represents a hydrogen or a halogen atom, and n represents a real number that satisfies $0 \leq n \leq 3$.

21. The method of claim 20, further comprising one or more external electron donor components.

\* \* \* \* \*